(12) United States Patent
Johnson et al.

(10) Patent No.: US 7,644,887 B2
(45) Date of Patent: Jan. 12, 2010

(54) YAW CONTROL SYSTEM AND METHOD

(76) Inventors: Edward D. Johnson, 162 Pine St., Jarvisburg, NC (US) 27947; Howard C. Kress, Jr., P.O. Box 3526, Kill Devil Hills, NC (US) 27948

( * ) Notice: Subject to any disclaimer, the term of this patent is extended or adjusted under 35 U.S.C. 154(b) by 574 days.

(21) Appl. No.: 11/678,044

(22) Filed: Feb. 22, 2007

(65) Prior Publication Data
US 2008/0203222 A1    Aug. 28, 2008

(51) Int. Cl.
*B64C 27/10* (2006.01)
*B64C 27/615* (2006.01)

(52) U.S. Cl. .................. 244/17.19; 244/17.23; 416/1; 416/23

(58) Field of Classification Search ............. 244/17.11, 244/17.23, 17.19, 17.25; 416/1, 23–24, 130; 446/36, 37
See application file for complete search history.

(56) References Cited

U.S. PATENT DOCUMENTS

| | | | |
|---|---|---|---|
| 1,836,406 A | | 12/1931 | Smith |
| 1,960,141 A | * | 5/1934 | Ascanio ................. 416/23 |
| 2,023,760 A | * | 12/1935 | Dornier ................ 244/17.17 |
| 2,180,922 A | | 11/1939 | De Bothezat |
| 2,373,825 A | | 4/1945 | Grady |
| 2,437,789 A | | 3/1948 | Robins |
| 2,438,661 A | | 3/1948 | Grady |
| 2,456,485 A | | 12/1948 | Bendix |
| 2,461,348 A | | 2/1949 | Pentecost |
| 2,464,726 A | * | 3/1949 | Stalker .................. 416/20 R |
| 2,483,480 A | * | 10/1949 | Stalker .................. 244/17.23 |
| 2,486,059 A | | 10/1949 | Pentecost |
| 2,835,331 A | | 5/1958 | Ryan et al. |
| 3,002,711 A | | 10/1961 | Stefano |
| 3,025,022 A | * | 3/1962 | Girard .................... 244/7 A |
| 3,213,944 A | | 10/1965 | Nichols et al. |
| 3,215,370 A | * | 11/1965 | Llewellyn ............... 244/17.11 |
| 3,563,496 A | * | 2/1971 | Zuck ..................... 244/7 A |
| 3,588,273 A | | 6/1971 | Kizilos |
| 3,717,317 A | * | 2/1973 | Certain .................. 244/17.13 |
| 3,814,351 A | | 6/1974 | Bielawa |
| 4,461,611 A | * | 7/1984 | Michel ................... 416/24 |
| 4,913,376 A | | 4/1990 | Black |
| 5,150,864 A | * | 9/1992 | Roglin et al. ............ 244/219 |
| 5,240,204 A | | 8/1993 | Kunz |
| 5,255,871 A | | 10/1993 | Ikeda |
| 5,601,257 A | * | 2/1997 | McKann ................. 244/17.25 |
| 5,639,215 A | * | 6/1997 | Yamakawa et al. ........ 416/23 |

(Continued)

*Primary Examiner*—Michael R Mansen
*Assistant Examiner*—Joseph W Sanderson
(74) *Attorney, Agent, or Firm*—Law Office of Peter G. Korytnyk, PLLC

(57) ABSTRACT

A yaw control system and a method of controlling yaw for an aircraft are provided. The yaw control system includes a first wing set and a second wing set which are rotatable in opposite directions. Each of the wing sets includes at least two wings each including a pivotable flap forming a trailing edge of its respective wing. A flap control assembly controls the pivotable flaps of the first wing set and of the second wing set such that when the pivotable flaps of the first wing set are pivoted in a first direction by a first set angle, the pivotable flaps of the second wing set are simultaneously pivoted by a second set angle in an opposite direction, thereby providing yaw control for the aircraft.

18 Claims, 7 Drawing Sheets

U.S. PATENT DOCUMENTS

| | | |
|---|---|---|
| 6,193,466 B1 | 2/2001 | Earl |
| 6,530,542 B2 * | 3/2003 | Toulmay .................. 244/17.13 |
| 6,669,137 B1 * | 12/2003 | Chen .......................... 244/7 R |
| 6,863,239 B2 * | 3/2005 | Terpay .................... 244/17.11 |
| 6,984,109 B2 * | 1/2006 | Bagai ........................... 416/1 |
| 2005/0236518 A1 | 10/2005 | Scott |
| 2007/0131820 A1 * | 6/2007 | Chaudhry et al. ........ 244/17.25 |

* cited by examiner

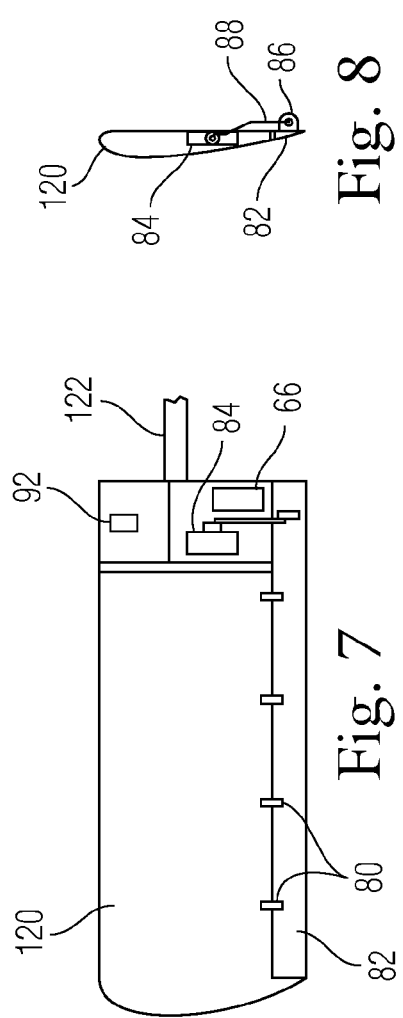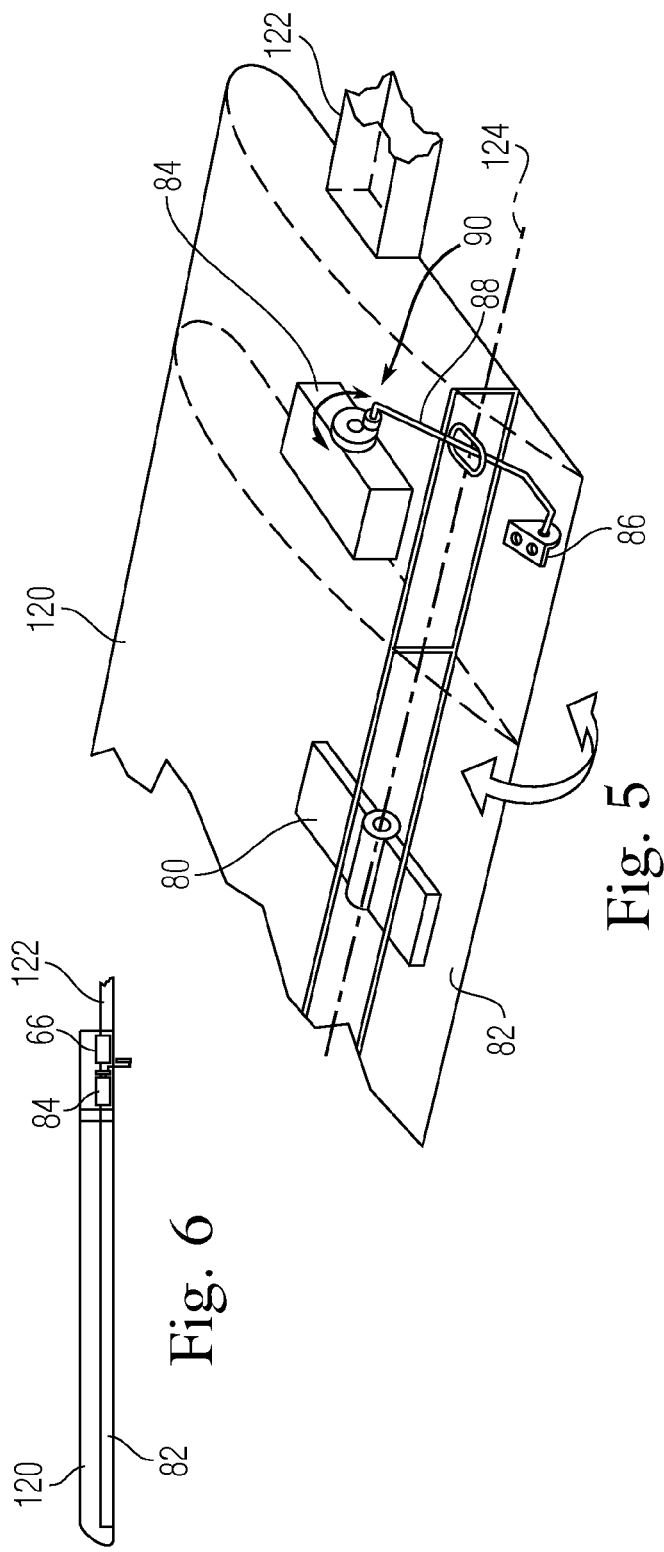

YAW CONTROL SYSTEM AND METHOD

FIELD OF THE INVENTION

The present teachings relate to a yaw control system and a method of controlling yaw. In particular, the present teachings relate to a yaw control system for aircraft having counter-rotating wing sets that eliminates the need for a tail boom by shifting a part of the total lift from one wing set to the other wing set to control yaw.

BACKGROUND OF THE INVENTION

Designs for vertical take-off and landing (VTOL) aircraft have existed for hundreds of years. As VTOL aircraft, helicopters have been effective but they are neither simple nor inexpensive to manufacture.

Many known single rotor helicopters incorporate mechanically complicated structures, such as swash plates, to control pitch and roll, as well as a tail rotor to control yaw. Known dual wing (dual rotor), counter-rotating, concentric-axis helicopters rely on a tail boom rudder or tail rotor to control yaw and incorporate swash plate configurations to control pitch and roll.

As a result, current helicopters are complex machines that are expensive to buy and maintain.

Accordingly, there exists a need for a system and method that achieves yaw control in an aircraft in a simple and inexpensive manner.

SUMMARY OF THE INVENTION

The present teachings disclose a system and method of controlling yaw for aircraft.

In particular, a yaw control system of the present teachings includes a first wing set rotatable in a first direction and a second wing set rotatable in a second direction. The first wing set includes at least two wings each including a pivotable flap forming a trailing edge of its respective wing. The second wing set also includes at least two wings each including a pivotable flap forming a trailing edge of its respective wing. A flap control assembly controls the pivotable flaps of the first wing set and of the second wing set such that when the pivotable flaps of the first wing set are pivoted in a first direction by a first set angle, the pivotable flaps of the second wing set are simultaneously pivoted by a second set angle in an opposite direction.

According to a further embodiment of the present teachings, a coaxial rotor system is provided. The coaxial rotor system includes a first rotor rotatable about an axis and having at least two wings each having a movable flap defining a wing trailing edge, and a second rotor rotatable about the axis and having at least two wings each having a movable flap defining a wing trailing edge. A flap control assembly is arranged to move the flaps of the first rotor in a first direction by a first set distance while simultaneously moving the flaps of the second rotor in an opposite direction by a second set distance such that a net lift produced by the first rotor and the second rotor remain substantially constant while one of the rotors experiences an increased drag while the other rotor experiences a decreased drag thereby creating a yaw altering torque.

According to a yet further embodiment of the present teachings, a method of controlling yaw in an aircraft is provided. The method includes providing a coaxial axis, dual rotor blade system whereby each rotor includes at least two wings each having an airfoil curvature that is capable of being modified. The method further includes creating a first yaw altering torque by increasing the curvature of the airfoils of the wings of the first rotor while simultaneously decreasing the curvature of the airfoils of the wings of the second rotor such that an increase of lift generated by the first rotor is substantially equal to the decrease in lift generated by the second rotor.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

BRIEF DESCRIPTION OF THE DRAWINGS

FIG. 5 is an enlarged, perspective view of region 5 of FIG. 1 and shows portions of the yaw control system according to various embodiments;

FIG. 6 is a side view of a trailing edge of a wing showing portions of the yaw control system according to various embodiments;

FIG. 7 is a top view of the wing of FIG. 6 showing portions of the yaw control system according to various embodiments;

FIG. 8 is a side end view of the wing of FIG. 6 showing portions of the yaw control system according to various embodiments;

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

Figure 1:
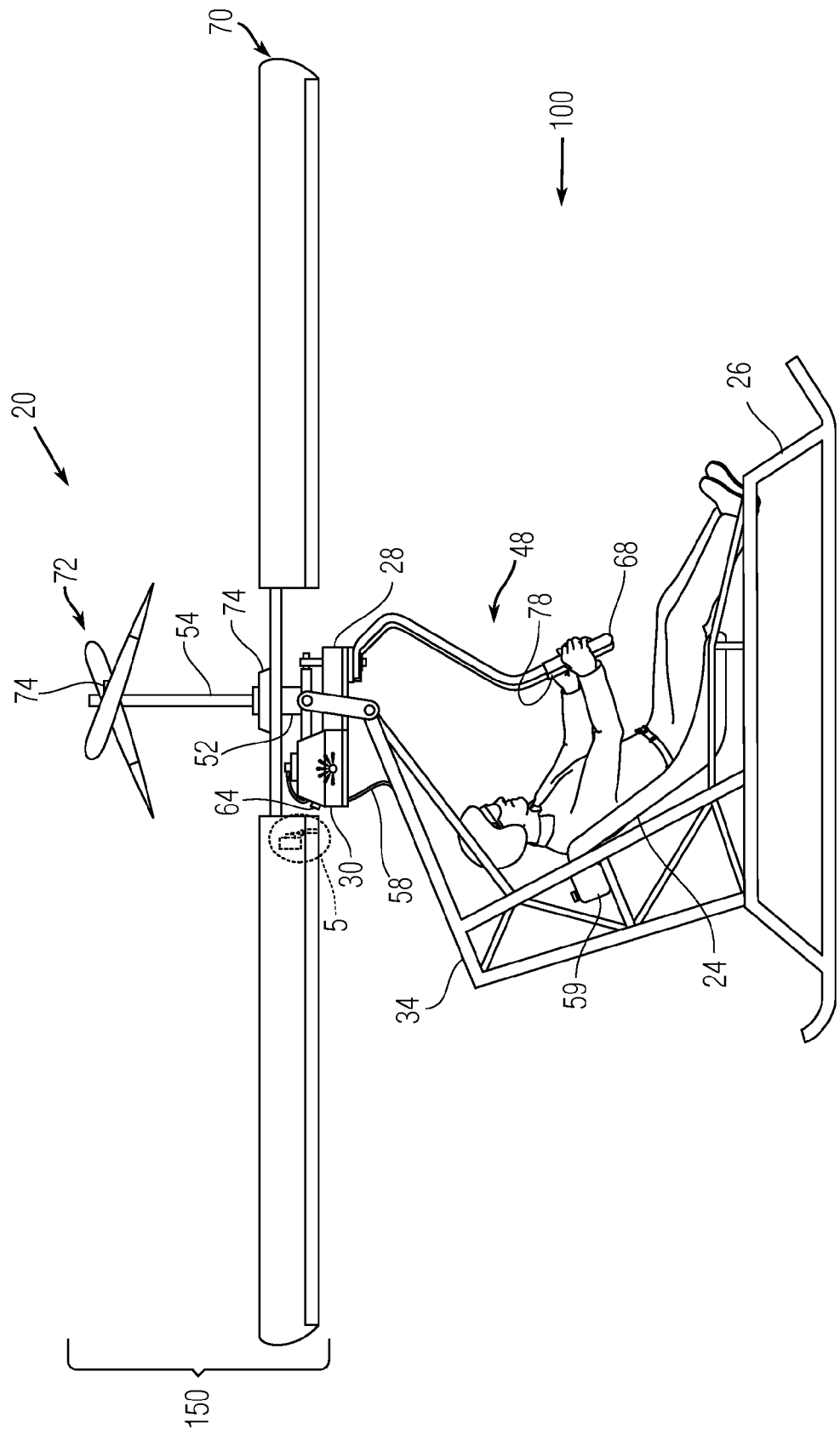
FIG. 1 is a side view of the yaw control system of the present teachings incorporated in an ultralight helicopter.

FIG. 1 shows an ultralight helicopter 100 incorporating the yaw control system 20 of the present teachings. While an ultralight helicopter 100 is described and shown throughout the present application, the yaw control system 20 of the present teachings can be incorporated in other types of aircraft, such as, for example, a backpack flyer for combat or rescue, a heavy-lift flyer for construction or cargo transport, a multi-passenger transporter allowing flexible deployment locations, and the like.

Figure 2:
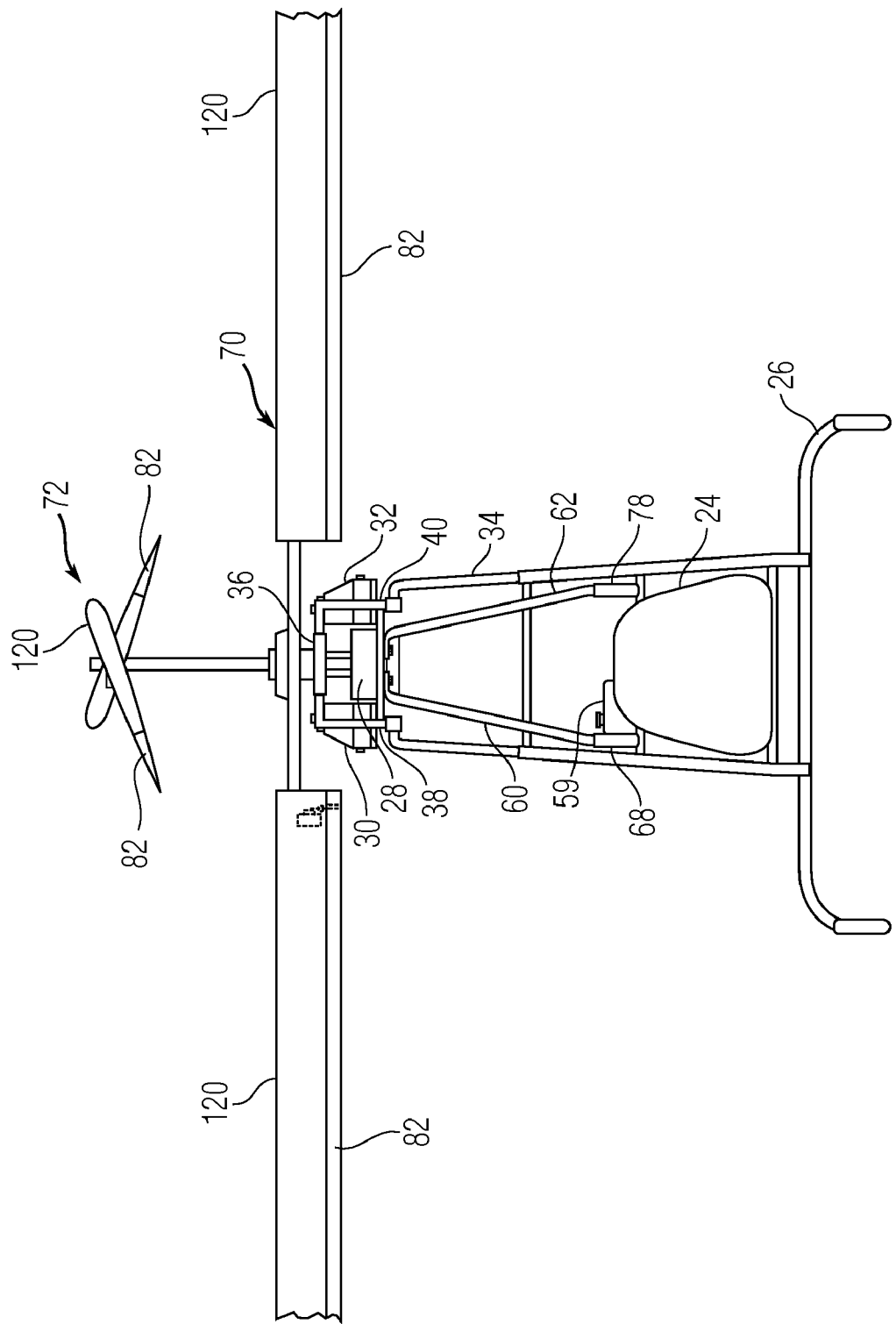
FIG. 2 is a front end view of the ultralight helicopter shown in FIG. 1.

Referring to FIGS. 1 and 2, a seat 24 for a pilot can be attached to an airframe 26 of the aircraft 100. A wing mast 34 or other type of support structure forming a portion of the airframe 26 can be arranged to pivotally support a powertrain and transmission for a wing set assembly 150 of the aircraft 100. For example, the powertrain and transmission can include a transmission 28 and one or more engines 30, 32. The one or more engines 30, 32 can be supplied with fuel by way of one or more fuel lines 58 and fuel tanks 59. As will be discussed in more detail below, the one or more engines 30, 32 and the transmission 28 can be arranged to power a wing set assembly including a counter-rotating dual wing set 150. The dual wing set 150 can include a bottom wing set 70 and a top wing set 72. A pilot-actuated control handle assembly 48 can be provided to provide operator control over at least the one or more engines 30, 32, the dual wing set 150, and the pitch and roll of the aircraft 100.

Figure 4:
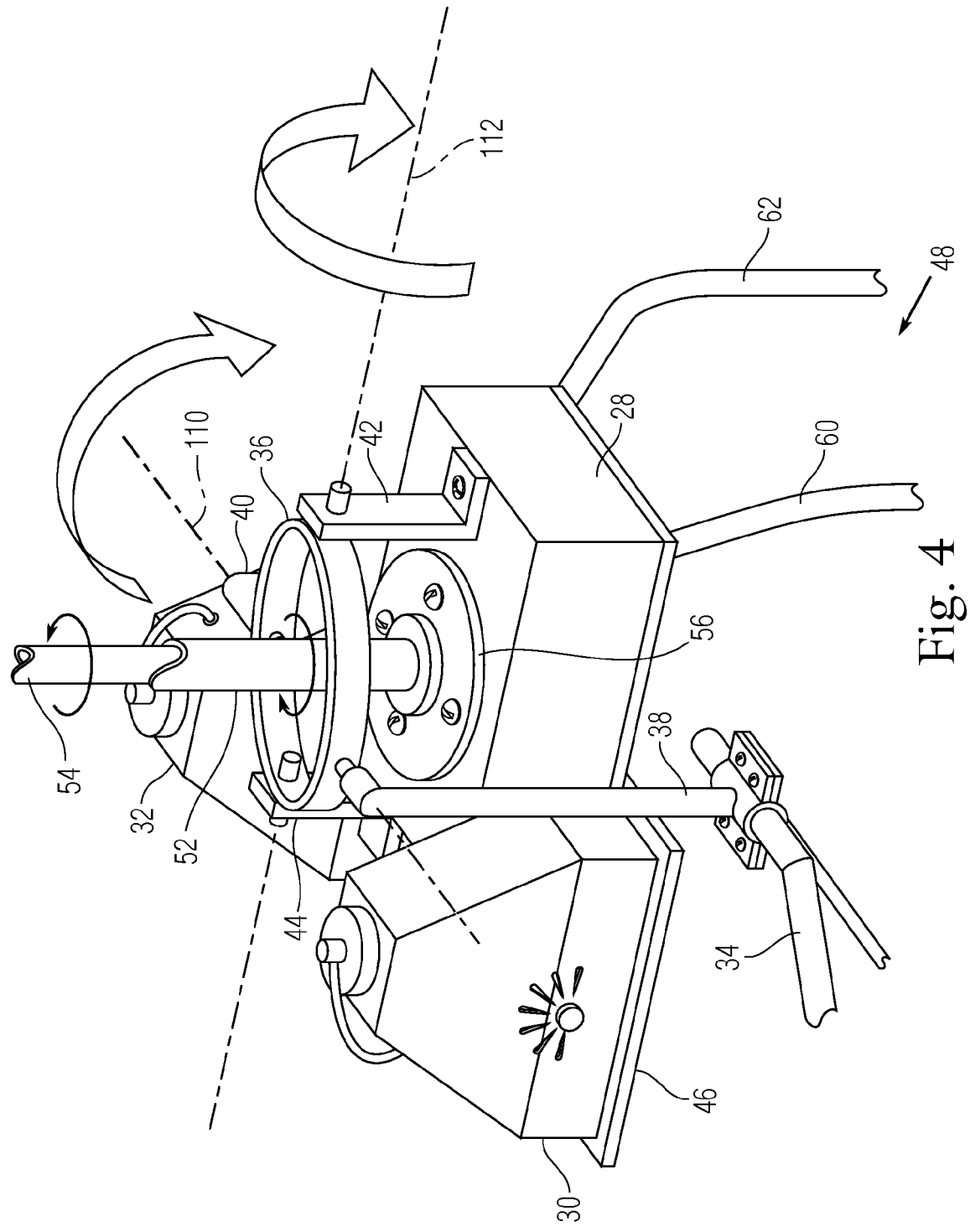
FIG. 4 is a close-up perspective view of the yaw control system shown in FIG. 1 according to various embodiments.

Referring to FIG. 4, the wing mast 34 of the airframe 26 can pivotally support the transmission 28 through center of gravity alignment arms 38, 40 and a wing control gimbals 36. The wing control gimbals 36 can be arranged in operative connection with the transmission 28 by way of support brackets 42, 44. A transmission base plate 46 can be arranged on an underside of a housing of the transmission 28. One or more engines 30, 32 can be supported by the transmission base plate 46. A pair of concentric axis, counter-rotating drive shafts 52, 54 can rotatably extend from the housing of the transmission 28 and can be arranged in driving connection with the bottom wing set 70 and the top wing set 72, respectively. The drive shafts 52, 54 can be rotatably supported by one or more drive shaft bearings 56 arranged on either side of the housing of the transmission 28. As shown in FIG. 1, each of the bottom wing set 70 and the top wing set 72 can be secured to a respective drive shaft 52, 54 via a connection hub 74 or other connection mechanism.

As shown in FIGS. 1, 2, 4, the pilot-actuated control handle assembly 48 can include one or more control bars 60, 62. Each of the one or more control bars 60, 62 can include a user-manipulatable handle portion, such as handle portions 68, 78, respectively. For example, control bar 60 can support a handgrip-style engine speed control handle 68 at its lower end. The engine speed control handle 68 can include a throttle control that is in operative connection with a fuel control mechanism, such as, for example, one or more carburetors of the engines 30, 32.

Further, yaw control bar 62 can support a handgrip-style yaw control handle 78 at its lower end. As will be more fully discussed below, manipulation of the yaw control handle 78 can be arranged to control the yaw control system 20 of the present teachings. For example, manipulation of the yaw control handle 78 can result in one or more control signals being communicated to the dual wing set 150. Such signals can be communicated to the dual wing set 150 wirelessly by way of a radio transmitter 64 mounted on the aircraft 100, as shown in FIG. 1.

Referring to FIG. 4, the one or more control bars 60, 62 can be operatively connected to a pivotably arranged portion of the aircraft 100, such as, for example, the housing of the transmission 28. Preferably, the control bars 60, 62 can be connected to the transmission base plate 46. During flight, a pilot can adjust the pitch of the wing sets 70, 72 by pulling or pushing the control bars 60, 62 toward and away from his body. Such a motion will result in the wing sets 70, 72 being pivoted with respect to the airframe 26 through a pitch pivot axis 110. The pitch pivot axis 110 can extend in a lateral direction with respect to the longitudinal axis of the aircraft 100. In this manner, the wing sets 70, 72 can be pitched to the front or back of the aircraft 100.

Similarly, a pilot can adjust the roll angle of the wing sets 70, 72 by moving the control bars 60, 62 in a direction to the left or right of his body. Such a motion will result in the wing sets 70, 72 being rolled with respect to the airframe 26 through a roll pivot axis 112. The roll pivot axis 112 can extend in a direction which coincides with the longitudinal axis of the aircraft 100.

Figure 3:
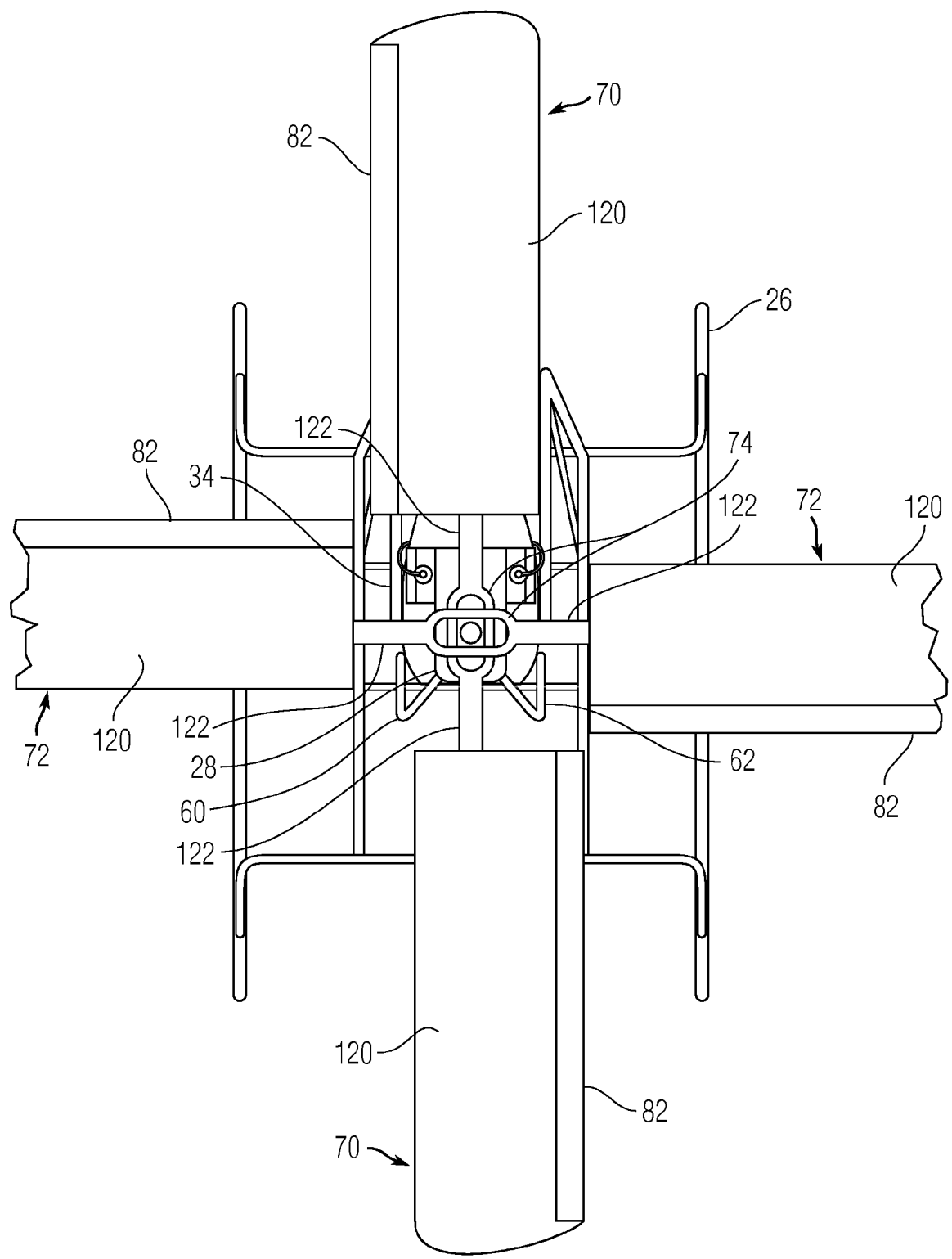
FIG. 3 is a top view of the ultralight helicopter shown in FIG. 1.

The yaw control system 20 of the present teachings will now be described with reference to FIGS. 3, 5-8. Referring initially to FIGS. 3 and 7, each wing set 70, 72 can include a pair of wings 120. The wings 120 of a respective wing set can extend radially outwardly in diametrically opposite directions by way of wing spars 122. The wings 120 and/or the wing spars 122 can be arranged to provide the wing sets 70, 72 with a fixed angle of attack.

One or more wings 120 can include a pivotable flap, referred hereinafter to as a yawleron 82. As shown in FIGS. 5 and 8, the yawlerons 82 can be pivotally attached to a wing 120 by way of one or more hinges 80 such that the yawlerons 82 form a trailing edge of the wing 120. The hinges 80 allow the yawlerons 82 to pivot about a pivot axis 124 above and below a plane of a chord of a wing 120. Each yawleron 82 can define the trailing edge of a respective wing 120. According to an embodiment, a yawleron 82 can define about 50% or more of the trailing edge of a wing 120, and preferably can define about 90% or more of the trailing edge of a wing 120, and most preferably can define substantially the entire trailing edge of a wing 120.

A control system for controlling the pivotal motion of the yawlerons 82 will be described with reference to FIG. 5. Each hinged yawleron 82 can be operatively connected to one or more motors 84 which can be powered to control pivotal movement of the yawleron 82. For example, the motor 84 can be a servo motor that is mounted on a wing 120. The servo motor 84 can be connected to the yawleron 82 by an actuator linking rod 88. One end of the linking rod 88 can be connected with the yawleron 82 by way of a bracket arm 86 and the other end of the linking rod 88 can connect to a drive wheel and pin assembly 90. Accordingly, a control signal directing a rotation of the servo motor 84 in one direction will pivotally raise the yawleron 82 about hinge pivot axis 124 and a control signal directing a rotation of the servo motor 84 in the other direction will pivotally lower the yawleron 82 about hinge pivot axis 124.

As shown in FIGS. 6 and 7, one or more receivers 66 can be provided to receive control signals from the pilot to control the operation of one or more servo motors 84. Receivers 66 can be provided in various locations on the aircraft 100, and preferably on or in the vicinity of the wings 120. The receivers 66 can be wireless receivers which receive wireless signals from one or more radio transmitters 64 situated on the aircraft 100. As shown in FIG. 1, a radio transmitter 64 can be mounted on the housing of the transmission 28 but could be located anywhere on the aircraft 100 so as to be in radio contact with the one or more of the radio receivers 66. The radio transmitter 64 can broadcast electromagnetic energy whose frequency can resonate with one or more of the radio receivers 66 arranged with the wings 120. During operation, a radio receiver 66 arranged in a wing 120 receives control signals from the radio transmitter 64 and sends a corresponding control signal to a servo motor 84 which is energized to raise or lower a yawleron 82.

One or more power packs 92 can be provided to deliver electrical power to the servo motor 84 and the radio receiver 66. The one or more power packs 92 can be provided in various locations on the aircraft 100, and preferably on or in the vicinity of a wing 120.

According to various embodiments, other control mechanisms can be implemented to achieve pivotal motion of the yawlerons 82. For example, mechanical, pneumatic, electric, radio, or other control links to a pilot can be calibrated as required to optimize the pivotal motion of the yawlerons 82.

During operation of the yaw control system 20 of the present teachings, a pilot manipulates a controller, such as, for example, the yaw control handle 78, which results in a coordinated movement of the yawlerons 82 to achieve yaw adjustment of the aircraft 100. More specifically, in each of the bottom wing set 70 and the top wing set 72, the yawlerons 82 of each wing 120 are arranged to pivot in tandem. In other words, both of the yawlerons 82 of the top wing set 72 are coordinated to pivot upwardly and downwardly in concert with respect to a neutral position. Similarly, both of the yawlerons 82 of the bottom wing set 70 are also coordinated to pivot upwardly and downwardly in concert with respect to a neutral position. The coordinated pivoting movement of the yawlerons 82 in each of the wing sets 70, 72, can be arranged such that the pivot angles of each yawleron 82 is substantially identical during the full range of pivotal motion of the yawlerons 82.

Simultaneously, the yawlerons 82 of the bottom wing set 70 and the yawlerons of the top wing set 72 are also coordinated to move in concert with each other as follows. As the yawlerons 82 of the bottom wing set 70 are pivoted downwardly from the neutral position, the yawlerons 82 of the top wing set 72 are pivoted upwardly from the neutral position. The opposite is also true for the coordinated movement between the wingsets 70, 72. That is, as the yawlerons 82 of the bottom wing set 70 are pivoted upwardly from the neutral position, the yawlerons 82 of the top wing set 72 are pivoted downwardly from the neutral position.

At any time during the operation of the yaw control system 20 of the present teachings, the wing set 70, 72 whose yawlerons 82 are in a downwardly pivoted position with respect to a neutral position generates more lift than when its yawlerons 82 are in the neutral position. The wing set 70, 72 whose yawlerons 82 are in the upwardly pivoted position with respect to a neutral position generates less lift than when its yawlerons 82 are in the neutral position. In the yaw control system 20 of the present teachings, the ratio of the amount of downward pivot of the yawlerons 82 of one of the wingsets 70, 72 to the amount of upward pivot of the yawlerons 82 of the other wingsets 70, 72 can be strictly coordinated so that an increase in lift of one wing set 70, 72 is equal to the decrease in lift of the other wing set 70, 72. Accordingly, a total lift produced by both wing sets 70, 72 at any time during flight is substantially equal to the total lift of both wing sets 70, 72 when their yawlerons 82 are in the neutral position.

Accordingly, in effect some part of the lift is shifted from one wing set 70, 72 to the other wing set 70, 72 during operation of the yaw control system 20 of the present teachings. The wing set 70, 72 producing the increased lift experiences a concomitant increase in drag, while the other wing set 70, 72 experiences a decreased drag. These corresponding increases and decreases in drag can be used to control the yawing of the aircraft 100, as explained further below.

As has been discussed above, the wing sets 70, 72 are rotated by at least one or more engines 30, 32 that are connected to the airframe 26. When the yawlerons 82 are in a neutral position, the engines 30, 32 experience no net torque. When one of the wing sets 70, 72 is subjected to increased drag, it offers increased resistance to rotation. The other wing set 70, 72 experiences less drag and offers less resistance to being rotated. Increased resistance from one wing set 70, 72 coupled with less resistance from the other wing set 70, 72 results in a net torque in one direction on the one or more engines 30, 32 which is transmitted to the airframe 26. This torque manifests itself as yaw by the airframe 26 in the same direction of rotation as the net torque on the one or more engines 30, 32. When the lift is shifted to the opposite wing set 70, 72, the torque is generated in the opposite direction whereby the airframe 26 yaws in the opposite direction.

As the lift is shifted between the wingsets 70, 72, the total lift on the aircraft 100 is unchanged. Accordingly, in level flight the altitude of the aircraft 100 remains unchanged. Similarly, a rate of descent or a rate of ascent will be unchanged as the aircraft 100 yaws in either direction. In a hover mode, the aircraft 100 will remain at a constant altitude as the aircraft 100 yaws in either direction.

Accordingly, in the yaw control system 20 of the present teachings, the yawlerons 82 of the top and bottom wing sets 70, 72 are arranged to move simultaneously in opposite directions in strictly defined increments so that the combined lift of the wing sets 70, 72 remains constant while producing yaw in a direction desired by the pilot of the aircraft 100.

According to various embodiments, the yawlerons 82 of the top wing set 72 and the yawlerons 82 of the bottom wing set 70 do not necessarily move or pivot by the same amount of rotation. Instead, they can be arranged to move independently to different angles in order to optimally achieve the most efficient shift of lift from one wing set to the other wing set. That is, the yawleron 'up' angle of one wing set does not necessarily correspond to the optimum 'down' angle of the other wing set. Such an arrangement can be due to the characteristics of the specific airfoil design that is chosen for the wings.

Figure 9:
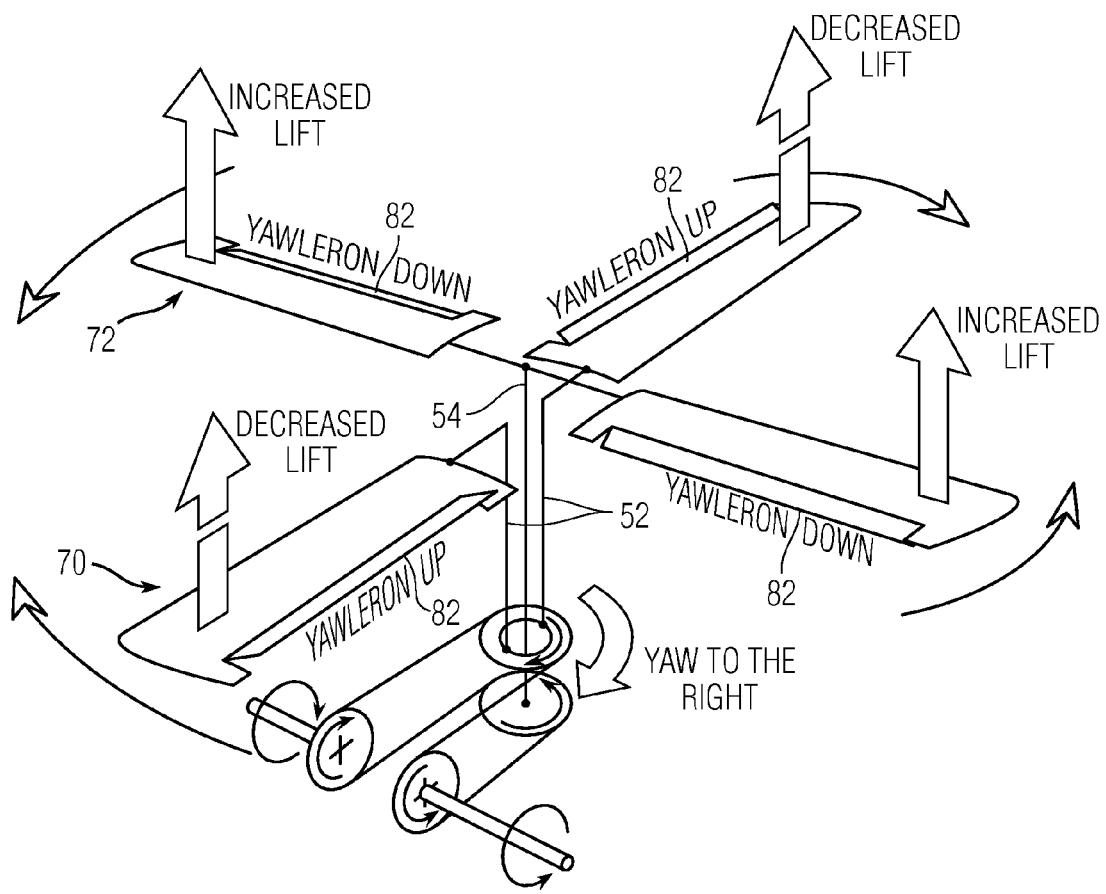
FIG. 9 is a schematic drawing of the yaw control system of the present teachings in a position that produces a right-hand yaw.
Figure 10:
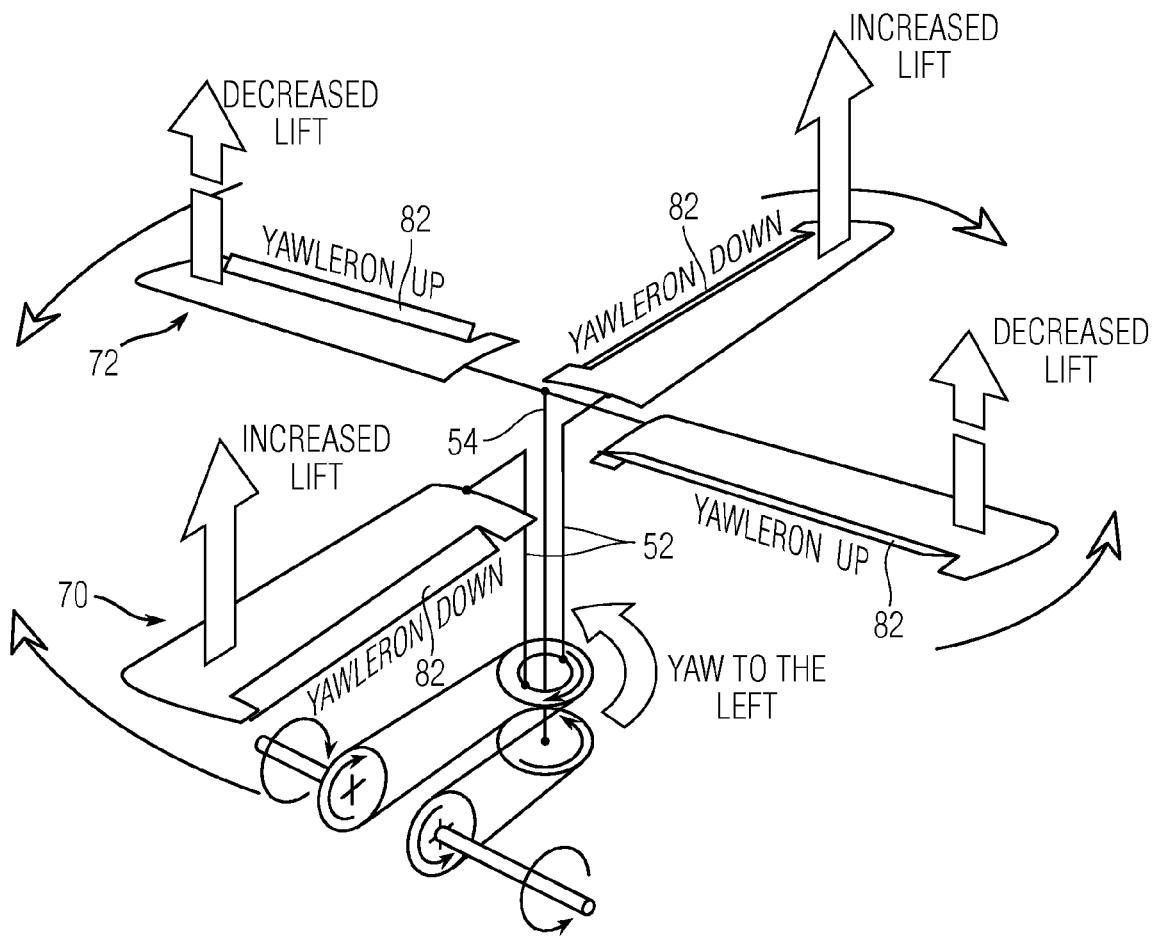
FIG. 10 is a schematic drawing of the yaw control system of the present teachings in a position that produces a left-hand yaw.

A brief description of pilot controlled operation of yaw control system 20 of the present teachings will now be provided with additional reference to FIGS. 9 and 10.

As a pilot rotates the yaw control handle 62 in a clockwise direction, for example, signals can be sent from the radio transmitter 64 to one or more radio receivers 66 arranged on the wings 120. Radio receivers 66 arranged on the wings 120 of the top wing set 72 can receive signals directing corresponding servo motors 84 to rotate and to reciprocate linking rods 88, thereby pivoting bracket arms 86 attached to corresponding yawlerons 82. As shown in FIG. 9, this pivoting action rotates the yawlerons 82 of the top wing set 72 in concert downwardly about their hinge axes 124. As a result, the curvature of the airfoils of the wings 120 of the top wing set 72 are effectively increased, producing increased lift which is accompanied by an increased drag on the top wing set 72.

Simultaneously, radio receivers 66 arranged on the wings 120 of the bottom wing set 70 each direct corresponding servo motors 84 to rotate and reciprocate linking rods 88, thereby pivoting bracket arms 86 attached to corresponding yawlerons 82. As shown in FIG. 9, this pivoting action rotates the yawlerons 82 of the bottom wing set 70 in concert upwardly about their hinge axes 124. As a result, the curvature of the airfoils of the wings 120 of the bottom wing set 70 are effectively decreased, resulting in decreased lift which is accompanied by a decreased drag on the bottom wing set 70.

In this condition, the sum of the torque vectors on the wing drive shafts 52, 54 is not equal to zero. For example, the wing drive shaft 54 for the top wing set 72 is producing more torque in a counter-clockwise direction than the wing drive shaft 52 is producing in a clockwise direction. The airframe 26 is not anchored to any massive body and is therefore free to rotate about an axis substantially coaxial with the axis of the wing drive shafts 52, 54. Because the torque on the wing drive shafts 52, 54 is generated by the one or more engines 30, 32 which are attached to the airframe 26, an equal but opposite torque vector acts on the airframe 26 through the corresponding engine which turns the airframe 26 in a clockwise direction, and the aircraft 100 yaws to the right.

According to various embodiments, the radio transmitter 64 and the one or more receivers 66 can be arranged to respond proportionally to the amount of rotation of the yaw control handle 62. For example, turning the yaw control handle 62 one-third of its maximum rotation will produce one-third of a maximum movement of the yawlerons 82 in the desired directions. Therefore, the yaw control handle 62 of the yaw control system 20 of the present teachings can be arranged to control rate of yaw and yaw direction.

At this point, if for example, the airframe 26 is facing 90 degrees to the right from the direction the pilot desires, the pilot can rotate the yaw control handle 62 in a counter-clockwise direction. This action sets the yawlerons 82 into a configuration opposite to previously described, see FIG. 10, and the airframe 26 yaws left. When the airframe 26 is facing in the desired direction, the pilot returns the yaw control handle 62 to its neutral position, and yawing of the aircraft 100 is halted.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A yaw control system comprising:
   a first wing set rotatable in a first direction, the first wing set including at least two wings each including a pivotable flap forming a trailing edge of its respective wing;
   a second wing set rotatable in a second direction opposite from the first direction, the second wing set including at least two wings each including a pivotable flap forming a trailing edge of its respective wing; and
   a flap control assembly which controls the pivotable flaps of the first wing set and of the second wing set such that when the pivotable flaps of the first wing set are pivoted in a first direction by a first set angle, the pivotable flaps of the second wing set are simultaneously pivoted by a second set angle in an opposite direction.

2. The yaw control system of claim 1, wherein the first set angle is substantially equal to the second set angle.

3. The yaw control system of claim 1, wherein at least one of the flaps defines about 90% or more of the trailing edge of a wing.

4. The yaw control system of claim 3, wherein at least one of the flaps defines substantially the entire trailing edge of a wing.

5. The yaw control system of claim 1, wherein each of the pivotable flaps of the first wing set are arranged to pivot upwardly and downwardly substantially in concert with each other, and each of the pivotable flaps of the second wing set are arranged to pivot upwardly and downwardly in concert with each other.

6. The yaw control system of claim 5, wherein each wing of the first and second wing sets includes a radio receiver capable of receiving a wireless signal and directing a motor to pivot a respective pivotable flap.

7. The yaw control system of claim 1, wherein the first wing set and the second wing set are rotatable about a coaxial axis.

8. The yaw control system of claim 1, wherein the wings of the first wing set and of the second wing set are fixedly arranged such that each wing does not rotate about its respective longitudinal axis.

9. A coaxial rotor system comprising:
   a first rotor rotatable about an axis and including at least two wings each having a movable flap defining a wing trailing edge;
   a second rotor rotatable about the axis and including at least two wings each having a movable flap defining a wing trailing edge; and
   a flap control assembly arranged to move the flaps of the first rotor in a first direction by a first set distance while simultaneously moving the flaps of the second rotor in an opposite direction by a second set distance such that a net lift produced by the first rotor and the second rotor remain substantially constant while one of the rotors experiences an increased drag while the other rotor experiences a decreased drag thereby creating a yaw altering torque.

10. The coaxial rotor system of claim 9, wherein the first set distance is substantially equal to the second set distance.

11. The coaxial rotor system of claim 9, wherein at least one of the pivotable flaps defines about 90% or more of the trailing edge of a wing.

12. The coaxial rotor system of claim 11, wherein at least one of the pivotable flaps defines substantially the entire trailing edge of a wing.

13. The coaxial rotor system of claim 9, wherein each of the pivotable flaps of the first rotor are arranged to pivot upwardly and downwardly substantially in concert with each other, and each of the pivotable flaps of the second rotor are arranged to pivot upwardly and downwardly in concert with each other.

14. The coaxial rotor system of claim 13, wherein each wing of the rotors includes a radio receiver capable of receiving a wireless signal and directing a motor to pivot a respective pivotable flap.

15. The yaw control system of claim 9, wherein the wings of the first rotor and of the second rotor are fixed such that each wing does not rotate about its respective longitudinal axis.

16. A method of controlling yaw in an aircraft comprising:
   providing a coaxial axis, dual rotor blade system, each rotor including at least two wings each having an airfoil curvature that is capable of being modified; and
   creating a first yaw altering torque by increasing the curvature of the airfoils of the wings of the first rotor while simultaneously decreasing the curvature of the airfoils of the wings of the second rotor such that an increase of lift generated by the first rotor is substantially equal to the decrease in lift generated by the second rotor,
   wherein the airfoil of each wing is modified by pivoting a flap that defines a wing trailing edge.

17. The method of controlling yaw of claim 16, further comprising creating a second yaw altering torque by decreasing the curvature of the airfoils of the wings of the first rotor while simultaneously increasing the curvature of the airfoils of the wings of the second rotor such that a decrease in lift generated by the first rotor is substantially equal to the increase in lift generated by the second rotor.

18. The method of controlling yaw of claim 16, wherein increasing the curvature of the airfoils of the wings of the first rotor includes increasing the airfoil of each wing substantially equally and wherein decreasing the curvature of the airfoils of the wings of the second rotor includes decreasing the airfoil of each wing substantially equally.

* * * * *